(12) United States Patent
Rees

(10) Patent No.: US 6,211,808 B1
(45) Date of Patent: Apr. 3, 2001

(54) COLLISION AVOIDANCE SYSTEM FOR USE IN AIRCRAFT

(75) Inventor: Frank L. Rees, Baltimore, MD (US)

(73) Assignee: Flight Safety Technologies Inc., New London, CT (US)

( * ) Notice: Subject to any disclaimer, the term of this patent is extended or adjusted under 35 U.S.C. 154(b) by 0 days.

(21) Appl. No.: 09/255,269

(22) Filed: Feb. 23, 1999

(51) Int. Cl.[7] ........................................ G01S 13/93
(52) U.S. Cl. ........................... 342/29; 342/27; 342/41; 343/705; 343/709; 343/711; 343/713; 343/718
(58) Field of Search ................... 342/24, 27–32, 342/41; 343/705, 708–713, 718

(56) References Cited

U.S. PATENT DOCUMENTS

| | | |
|---|---|---|
| 3,620,626 | 11/1971 | Daly et al. . |
| 3,714,651 | 1/1973 | Lyon . |
| 3,961,321 * | 6/1976 | Moss ................................ 342/27 X |
| 3,986,182 * | 10/1976 | Hackett .............................. 342/28 X |
| 4,027,307 * | 5/1977 | Litchford ................................ 342/32 |
| 4,208,659 | 6/1980 | Allezard . |
| 4,277,170 | 7/1981 | Miles . |
| 4,405,925 * | 9/1983 | Lindner et al. ......................... 342/28 |
| 4,755,818 | 7/1988 | Conrad . |
| 4,835,537 | 5/1989 | Manion . |
| 4,918,442 | 4/1990 | Bogart, Jr. . |
| 4,951,056 | 8/1990 | Cope et al. . |
| 5,057,833 | 10/1991 | Carlson . |
| 5,111,210 * | 5/1992 | Morse ................................ 342/27 X |
| 5,291,196 | 3/1994 | Defour . |
| 5,321,489 | 6/1994 | Defour et al. . |
| 5,451,957 | 9/1995 | Klausing . |
| 5,497,157 | 3/1996 | Gruener et al. . |
| 5,638,281 | 6/1997 | Wang . |

\* cited by examiner

Primary Examiner—Bernarr E. Gregory
(74) Attorney, Agent, or Firm—David A. Tamburro

(57) ABSTRACT

A collision avoidance system mountable on an aircraft for providing to the pilot of that aircraft an early warning of the presence of another nearby threat aircraft within the surrounding air space. The system operates autonomously from that aircraft and does not require the presence of any matched system on board the threat aircraft. The system includes an omni-directional L-band microwave antenna formed by a dielectric sphere cut into eight equal "orange wedge" sectors covering eight distinct beam patterns. Eight L-band microwave signals are transmitted simultaneously from all eight dielectric sectors to provide a sphere of detection around the aircraft. The sectors also act as receivers for detecting a microwave signal reflected back from the threat aircraft, and indicating means provides information to the pilot regarding the direction, closeness and rate of closure of the threat aircraft.

14 Claims, 2 Drawing Sheets

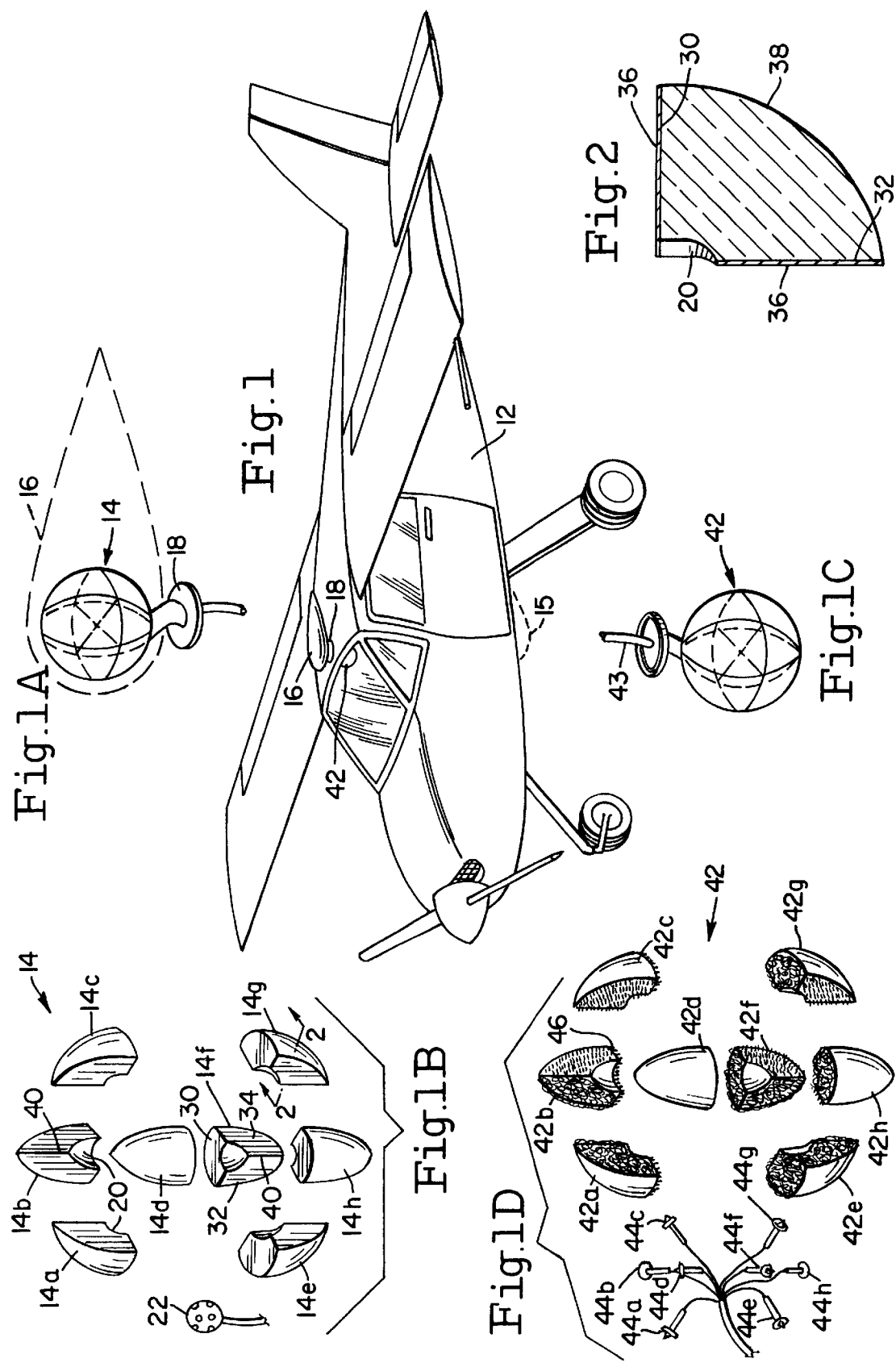

COLLISION AVOIDANCE SYSTEM FOR USE IN AIRCRAFT

BACKGROUND OF THE INVENTION

This invention relates generally to collision avoidance systems for aircraft and more particularly to a novel, low cost, universal collision, obviation and reduced near miss (UNICORN™) system which is particularly useful and affordable with small private aircraft.

In conditions of crowded air traffic zones and/or low visibility it is necessary that the pilot of one aircraft be warned of the presence of a nearby aircraft so that he may maneuver his aircraft to avoid a disastrous collision. Systems known as TCAS (Traffic Alert and Collision Avoidance Systems) employ an interrogator mounted on a commercial jet aircraft and transponders carried on each aircraft it is likely to encounter. In this way, an interrogation is communicated by radar between the aircraft carrying TCAS and smaller, threat aircraft in the vicinity. This is done so that an enhanced radar signal is returned to the jet aircraft to enable the commercial pilot to avoid a collision. The transponder also encodes the returned radar signal with information unique to the threat aircraft on which it is installed. A GPS receiver is also recommended in order to encode information regarding the position of a threat aircraft with respect to the position of the jet aircraft. With TCAS, the burden is on the commercial jet pilot to avoid a collision when an alert signal is received.

These systems however are very complicated and very costly and are used primarily on commercial sized aircraft. Because of the high cost, these systems are rarely incorporated on smaller, privately owned aircraft whose pilots are often flying blindly under adverse weather and traffic conditions, a situation which often leads to an unavoidable collision. General aviation pilots are also reluctant to incur the cost of installing a transponder without gaining autonomous control over averting a collision.

Thus, there is a need for a low cost, reliable warning and collision avoidance system particularly useful on smaller, privately owned aircraft to enhance flight safety conditions within the air traffic industry. The UNICORN™ system described hereinbelow fulfills that need.

SUMMARY OF THE INVENTION

Accordingly, the primary object of this invention is to provide a low cost, reliable, universal, omni-directional, sensing system mountable on an aircraft for providing to the pilot of that aircraft an early warning of the presence of another nearby aircraft within the surrounding air space, thus enabling the pilot to take whatever maneuvering action is necessary to avoid a collision with the other nearby aircraft.

Another object of this invention is to provide the above-identified system which operates autonomously from a single aircraft and requires no response from or the presence of any matched system on board the other nearby aircraft.

Still another object of the invention resides in the provision of the above described sensing system which includes an omni-directional L-band microwave antenna formed by a dielectric sphere cut into a plurality of "orange wedge" sectors, for example eight sectors, covering eight distinct transmitter/receiver direction patterns (up/down, port/starboard, forward/aft). An L-band microwave signal is transmitted simultaneously from all eight dielectric sections to provide an omnidirectional transmission covering a sphere of detection around the aircraft. In addition, the same eight dielectric sectors are employed together with suitable receiver circuitry for receiving microwave signals reflected back from other nearby aircraft. These sectors provide eight video channels by which a pilot of an aircraft receives information regarding the direction, closeness and rate of closure of the nearby aircraft so that a proper collision avoidance maneuver may be effected to avoid a disaster.

A further object of the invention resides in the above described system which, although autonomous within itself and requiring no cooperating response mechanism on nearby aircraft, is compatible and may be used together with TCAS-type transponders.

Other objects and advantages will become apparent from reading the following detailed description of the invention which makes reference to the accompanying drawings.

BRIEF DESCRIPTION OF THE DRAWINGS

FIG. 1 is a general perspective view of the UNICORN™ system of the invention illustrating the novel dielectric antenna mounted on top of an aircraft and the corresponding transparent display unit on or within the cockpit of the aircraft within easy vision of the pilot;

FIG. 1A illustrates the spherical antenna in enlarged view;

FIG. 1B illustrates the spherical antenna in exploded view;

FIG. 1C illustrates the transparent display unit in enlarged view;

FIG. 1D illustrates the display unit in exploded view;

FIG. 2 is a view taken along line 2—2 of FIG. 1B illustrating the coated surfaces on each of the sectors of the antenna;

DETAILED DESCRIPTION OF INVENTION

Figure 3:
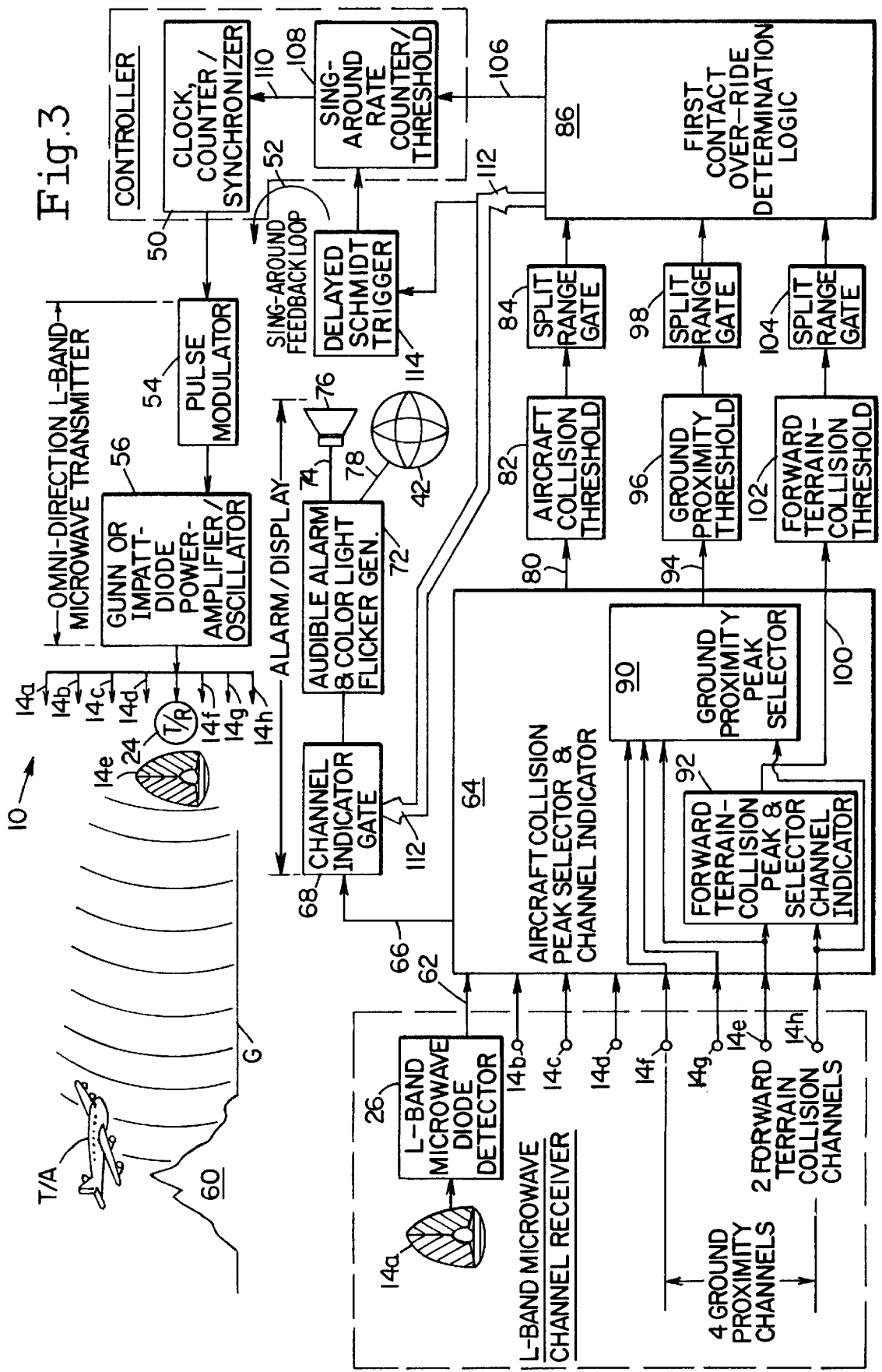
FIG. 3 illustrates an electrical schematic of the sensing and control circuitry incorporated in the UNICORN™ system of the invention.

The novel UNICORN™ system 10 of the invention as used primarily with smaller private aircraft 12 includes a hollowed-out spherical antenna 14 (FIG. 1A) constructed from a dielectric material such as polystyrene or Lucite. Antenna 14 is about twelve (12) inches in diameter and is mounted within a protective streamlined, unicorn shaped, transparent radar dome 16 fixed at 18 on the brow of the aircraft above the plane's cockpit. Dome 16 is constructed of a material which does not interfere with operation of antenna 14.

As shown in the exploded view of FIG. 1B, antenna 14 is formed by dissecting a hollowed-out sphere into a plurality of equal "orange-wedge" sectors, e.g. eight equal octanes 14a, 14b, 14c, 14d, 14e, 14f, 14g and 14h. Each octant has an inner edge 20 scooped out so that when the octants are fastened together as in FIG. 1A, a central cavity is formed which houses a signal transmitting and receiving component assembly 22 within. As will be described in detail with respect to FIG. 3, assembly 22 includes eight transmitting/receiving (T/R) diode switches 24 to which an L-band microwave signal is fed, the T/R switches when in the transmit mode then operating to drive simultaneously in phase all eight sectors or octant horns so as to transmit eight microwave signals omnidirectionally around antenna 14.

Assembly 22 also includes eight low-power, low noise L-band microwave-to-video detection diodes 26, one associated with each octant, for receiving any return signal reflected back from a nearly aircraft when the T/R switches 24 are in a receiving mode.

On each octant, the flat surfaces 30, 32 and 34 are coated with a conductive metal coating 36 such as silver or copper applied by a metal sputtering or vapor desposition process. The outer curved surface 38 of each octant is left uncoated and acts as a dielectric electromagnetic radiation and reception face. The coated surfaces 30, 32 and 34 on each ocatant guide or funnel the reflected waves received by outer face 38 inwardly to edge or corner 40 located immediately adjacent its associated detection diode 26.

The spherical antenna 14 is assembled by applying cement or glue to the coated surfaces 30, 32, and 34 of each octant and pressing the octants together with the component assembly 22 within the central hollow cavity. The cement should be of a type which may be dissolved by a solvent which does not damage the coatings 36 or the components of assembly 22, thus repairs may be made to the antenna and a malfunctioning antenna need not be discarded.

Antenna 14 may be mounted on the aircraft 12 so that sector 14d is facing a port-up/forward direction, sector 14a starboard, up/forward, sector 14c port/up/aft, sector 14b starboard/up/aft, sector 14h port/down/forward, sector 14e starboard/down/forward, sector 14g port/down/aft, and segment 14f starboard/down/aft. In this way antenna 14 provides universal, omnidirectional coverage around the aircraft.

A coaxial power cable 43 extends externally from antenna 14 and connects assembly 22 via the circuitry of FIG. 3 to a visual indicator display unit 42 mounted within the cockpit directly in front of and slightly above a pilot's eye level. As such, unit 42 is readily visible to the pilot without obstructing his normal forward view.

Display unit 42 is a transparent hollow sphere cut into eight "orange-wedge" sectors 42a–42h corresponding to sectors 14a–14h respectively, of antenna 14. A cluster of eight different colored indication lights 44a–44h is mounted within the sphere, with each light 44a–44h positioned adjacent its respective corresponding sector 42a–42h. Sectors 42a–42h are removably fastened together, e.g. by transparent Velcro connectors 46 mounted on the flat surfaces of the sectors, so that the lights may be quickly and easily changed when necessary. Display unit 42 is mounted in the cockpit in such a way that each of sectors 42a–42h is positioned and aligned with its corresponding sector 14a–14h so that when a pilot observes a lighted sector 42a–42h, he immediately knows the location of a nearby aircraft. For example, sector 42a would indicate a starboard/up/forward location or sector 42e, indicates a port/down/aft location. The pilot may then quickly take necessary evasive action.

The UNICORN™ system 10 of the invention mounted on aircraft 12, is controlled by a digital clock, counter/synchronizer 50 which is the central element in a "sing-around" feedback loop 52. In its quiescent mode, clock 50 feeds timing pulses to pulse modulator 54 at a minimum pulse repetition range (PRF) consistent with a desired radii of a "sphere of safety" around aircraft 12. Pulses from modulator 54 are then fed to a power amplifier/oscillator 56 which is tuned to one of certain L-band microwave frequencies permitted by the FCC. The power amplifier/oscillator 56 may be of a Gunn-diode type or an Impatt diode type. When a Gunn-diode type is used, the radius of the "sphere of safety" around the aircraft is approximately 2 nautical miles. Using a more expensive, higher end Impatt diode power amplifier oscillator, the radius of the sphere of safety is extended to about 5 nautical miles, which obviously improves the early warning time to the pilot or aircraft 12 against collisions with other threat aircraft such as aircraft TA within that sphere of safety.

The power amplifier/oscillator feeds a cluster of eight transmit/receiver (T/R) switches 24 each of which is coupled to one of the eight sectors 14a–14h of dielectric spherical antenna 14. When in the transmit mode, switches 24 operate to drive simultaneously in phase all eight sectors 14a–14h which thereby transmit eight microwave radar beams omnidirectionally around antenna 14 and aircraft 12.

When switches 24 are in a receive mode, any wave reflected off a threat aircraft TA, a forward terrain 60, or ground G and returning to and through the dielectric surface 30 of a corresponding one of the sectors 14a–14h will be detected by the one of a cluster of eight L-band microwave diode detectors 26 which is associated with that sector. As mentioned above, the conductive coatings 36 on flat surfaces 30, 32 and 34 guide or funnel the reflected returned waves to detectors 26 and thereby provide an aperture gain that enhances the detection capabilities of the system.

The returning L-band radar echo will provide return energy that will arrive at one of the receiver sectors 14a–14h close to the Maximum Respone Axis (MRA) of the receiver beam pattern of that segment. Around L-band frequency, e.g. approximately 1 gigahertz, the microwave emissions have a wavelength of about $3 \times 10^8$ m/s/$10^9$ hertz=0.3 meters=30 cm=1 foot, approximately. The bulk electromagnetic (em) wave in the dieletric waveguide antenna 14 travels at a phase wave-speed reduced below $3 \times 10^8$ m/s (the free space speed of light) by a ratio of the reciprocal of the square root of the permitivity of the dielectric chosen to that of free space. Thus, dieletric sphere 14 may have a diameter slightly less than one (1) foot.

Each of the detector diodes 26 provides a unidirectional pulsed rectified signal 62 to an aircraft collision peak selector and channel indicator 64. Diodes 26 will include a passive video matched filter, or a transistor video amplifier with a resistor/capacitor feedback circuit to effect an active form of video matched filtering, to produce signals 62.

The eight video amplified/video filtered signals 62 from each sector 14a–14h and its associated detector 26 are then subjected to an eight diode channel peak selection process by selector 64. The selector selects the largest of the eight signals 62 and only passes that signal as an output signal 66 to a channel indicator gate 68. The sector whose receive-beam pattern MRA is closer to the echo-arrival direction will be the one selected through channel indication logic within selector 64. Output signal 66 will indicate which one of sectors 14a–14h receives the peak signal, and thus indicates the direction from which that peak signal was received corresponding to the location of the threat aircraft TA or other obstacle. As a high end option, selector 64 may include a logrithmic amplifier using, e.g. a back-biased Zener solid state diode to facilitate receive-beam interpolation by pair-wise differencing between adjacent port-starboard and up-down receiver-beam channels, respectively, to enhance azimuth and elevation angle accuracy.

The channel indicator gate 60 passes a signal 70 to an audible alarm and light flicker/color light generator 72 which sends an audio alarm signal 74 to loudspeaker horn 76 and a light generating signal 78 to the transparent display sphere 42, both of which are mounted in the cockpit. The signal 78 carries information concerning the location or direction of a threat aircraft TA, the range of the threat aircraft, and the rate of closure of that aircraft. Consequently, the one of lights 44a–44h and its associated transparent sector 42a–44h which correspond to the one receiver section 14a–14h and its detector 26 which detected the peak return signal will light up and flicker and provide that information to the pilot. Similarly, by virtue of the "sing-around" action, the beeping and rate of beeping of horn 76 provides information regarding the distance or range of the threat aircraft TA and the rate of closure. With this information providing sufficient early warning time, the pilot of aircraft 12 can maneuver his plane to aovid a collision with aircraft TA.

A peak signal 80 is also passed from selector/indicator 64 to an aircraft collision threshold device 82 to establish an acceptable false alarm/contact rate in accordance with a span of contact to sphere-of-safety range dependent on SIR determined probabilities of detection.

The false contact rate (e.g. from clutter or other echoes) is further reduced by use of a split range gate 84 that indicates when a video signal, that has exceeded its respective threshold, exactly straddles between an early and a late range gate. This is indicated by differencing the area of the portion of the video pulse—where area is obtained through short-term integration and that falls in the early versus the late range gate. When the difference indication passes through zero, the center of the video pulse is located. Logic 86 is provided to ensure that the first contact is normally selected.

The selector and channel indicator 64 can be upgraded by providing a plug-in module 90 to facilitate a ground poximity warning and a plug-in module 92 to facilitate a forward terrain collision and angular directional avoidance indicator. Module 90 receives information from lower sectors 14e (starboard/down/forward), 14f (starboard, down/aft), 14g (port/down/aft), and 14h (port.down/forward) to derive as peak selected signal. Module 92 receives information from sectors 14e (starboard/down/foward) and 14h (port/down/forward) to derive a peak selected signal. As with the peak output signal 80 from unit 64, the peak ouput signal 94 from module 90 is subjected to thresholding circuitry 96 and split range gating circuitry 98 and then is passed into the logic circuitry 86. Similarly, the peak output signal 100 from module 92 is subjected to thresholding circuitry 102 and split range gating circuitry 104 and then passed into logic circuitry 86.

When one of the sectors 14a–14h detects a threat aircraft TA and selector 64 ultimately provides signal 80 which is processed through threshold device 82 and range gate 84 and then passed onto logic circuitry 86, that first threat contact is selected by that circuitry and a corresponding priority output signal 106 is captured by the sing-around feedback loop 52. Signal 106 is passed to sing-around rate counter threshold circuitry 108 which ensures that a ground proximity alarm will not be sounded or indicated during a normal landing glide-slope-descent rate situation. A signal 110 is passed from circuitry 108 to clock 50 to acitvate the next sing-around feedback loop cycle.

Each of the signals 94 and 100 from modules 90 and 92, respectively, may override the first threat contact of signal 80 by way of override determination circuitry in logic 86 so that the output signal 106 is representative of the highest priority threat. For example, if a ground echo would arrive in one of the four channels of sectors 14e–14h, the peak signal selected by logic 86 would be derived from output signal 100.

Another ouput signal 112 from logic 86 is fed to both channel indicator gate 68 and a delayed Schmidt trigger 114. Signal 112 as fed to gate 68 not only carries information regarding the channel selected, but also the channel in a contact-option group selected, e.g. information pertaining to a forward terrain collision alert as sensed by module 92 or a ground proximity alert as sensed by module 90. This information conditions the channel indicator gate 68 to activate the generator 72 to selectively produce differing identifying audible alarms at horn 76 and light flickering/color light signals on display sphere 42 from which the pilot of aircraft 12 may quickly take maneuvering action to avoid a collision.

The delayed Schmidt trigger 114 turns the threshold video signal 112 into a digital triggering ouput 116 fed to counter 108. The delay created by trigger 114 allows circuitry settling time after a returned threat signal is received and before the next sing-around feedback loop cycle is activated.

The sing-around rate control/threshold 108 already has been described. It is noted that apart from radial range information being implicit in the time between sing-around feedback loop cycles, the changes in the PRF of those cycles convey information on relative radial-range closure rate. This latter quantity is an important measure in gauging the imminence of a collision. However, under certain low closure rate circumstances (e.g., the descent rate in approaching ground proximity during a normal glide-slope landing), an audible alarm or a visual warning indication might be distractive. Of course, a manual override could be applied but requires some fore-thought on the part of the pilot. The purpose of counter 108 is to apply thresholding to the radial range closure rate information in order to preview the sing-around feedback loop 52 from being prematurely triggered during benign circumstances. Then, triggering is only effected when logic 86 dictates it is reasonable to consider the event as possibly threatening; otherwise, the controller returns the sing-around feedback loop to its quiescent state.

The channel indicator gate 58 already has been described. In the case of the basic UNICORN™ system without modules 90 and 92, its only function is to take the channel indication of signal 80, as validated through circuitry 82 and 84 with first contact selection performed by logic 86 as a means to instruct the audible alarm and light flickering colored lights how to perform in conveying radial range, radial range closure rate and octant sector contact information in a rapid but distinguishable and unambiguous way to the pilot.

The audible alarm and light flickering/colored light generation is used to generate the signals which drive the loudspeaker horn 76 as an audible alarm and the octant heads-up display 42 so as to provide the pilot with rapid, unambiguous and clear indications of impending collision situations along with concise information that would enable an immediate autonomous collision avoidance maneuver or sufficient early warning to not only obviate a collision but, also, to facilitate reducing a near miss.

The loudspeaker 76 would be used to reproduce various audible alarm tone sequences whose sound content would identify the type of impending collision or near miss while also conveying radial range and radial range closure rate through the changing PRF of these beep sequences—namely beep - - - beep - - - beep - - - beep - - - beep - - - beep—beep conveying some sense of urgency regarding the need to rapidly react.

In the transparent display sphere 42, different color-coded lights would identify the eight (8) threat corridors—namely port/up/forward, port/up/aft, port/down/forward, port/down/aft, starboard/up/forward, starboard/up/aft, starboard/down/forward, and starboard/down/aft. Furthermore, different color coding would be used to indicate ground-proximity warnings and forward terrain collision warning and avoidance indication. Light-flickering of the colored lights (similar to the audible alarm) will be used to convey degree of urgency in responding to an impending collision or near miss.

In very small cockpits in which overhead space is limited, it may be desirable to replace spherical display unit 42 with a pair of forward and aft flat screen displays mounted on the instrument panel.

As mentioned, there is a desire to make UNICORN™ compatible with TCAS requirements for smaller aircraft lacking a strong radar cross section (RCS) to respond to a TCAS installed aircraft radiated interrogation with a transponded signal encoded with aircraft type, GPS position (if available) and other information useful in rapidly assessing the likelihood of a collision. The decoding and encoding required for this transponder mode may be easily accommodated as an upgraded option along with the installation of a suitable GPS-receiver capability, respectively, accommodated in elements 64, 50 and 54. In addressing a concern about mutual interference, which would be much less prevalent with the lower microwave power levels associated with a UNICORN system (particularly under the Gunn diode option) relative to TCAS, a "whisper and shout" mode might be employed as a further upgraded option. This would involve pulsing the PA/OSC module 56 to radiate lower power during the quiescent mode than would be employed at full power once an alert cycle was being initiated.

It is worthy of mention that UNICORN™ does not face the problem addressed by TCAS. The TCAS was designed with the problem of large commercial airlines colliding with or descending onto smaller aircraft. These smaller aircraft have much smaller RCSs and, generally, do not have the air-speed performance of the airliner but, nevertheless, are better able to take violent evasive action. The smaller RCSs require radar echo return enhancement as provided by a pulse transponder. This, of course, enables other useful information, such as GPS receiver and other data to be added to the encoded transponder return by the smaller aircraft. Conversely, UNICORN™0 has smaller aircraft applications in mind, with the larger RCS airliners as one of the potential threat aircraft. Other lower RCS small aircraft (generally because of their lower airspeed) do not close as rapidly; thereby making the shorter range associated with a smaller RCS more acceptable due to the corresponding less rapid closure vis-a-vis the reduced early warning time.

With passenger and cabin crew safety in mind, commercial airliners are less apt to take a violent evasive maneuver to avoid a collision with a smaller aircraft until it became patently obvious that disaster was imminent. Conversely, a smaller aircraft, general aviation or corporate aviation, pilot provided by a UNICORN system may take autononomous control in sufficient time to avoid a catastrophe.

As described above, the eight sectors 14a–14h are glued together to form a spherical antenna 14 mounted on top of aircraft 12. On some aircraft, e.g. a high winged small aircraft such as a Piper cub, EM "shadowing" by the structure of the aircraft may be a consideration. In such a case, antenna 40 may be formed as separate upper and lower hemispheres each enclosed within its own protective dome 16. The upper hemisphere would be mounted in its normal position above and slightly behind the cockpit, while the lower hemisphere would be mounted diametrically opposite the upper hemisphere but below the plane as shown, e.g., in broken line at 15 in FIG. 1. Both hemispheres would be suitably connected via coaxial cables to display unit 42. Further, in very small aircraft in which the full spherical antenna may create aerodynamic drag, the antenna may be separated into more than two and as much as eight solid-angle sectors which would enable those sectors to be embedded into the aircraft skin in uniform distribution around the cross-section of the aircraft. This would minimize any aerodynamic drag.

UNICORN™ also could fulfull a role as an inexpensive marine collision warning device for use by recreational boaters avoiding collisions with large marine vessels. In this application only the upper hemisphere of the dielectric antenna would be needed. Furthermore, the omni-directional transmission would be polarized so as to reinforce the L-band microwave transmitter hemispherical coverage by virtue of a reinforcement by an ocean-surface reflected EM wave constructively interferring with the direct EM wave. The U.S. Coast Guard is conducting a large scale test of automatic identification system (AIS) technology. AIS bears great resemblance to TCAS; while also requiring GPS information as part of the transponded response. Importantly, UNICORN™ could not only be made compatible with AIS in addition to having its autonomous mode of operation, but, because of a four (4) quadrant angular capability (in the upper hemisphere), it would significantly improve the ability to enable Kalman-filter recursive/predictive processing to more accurately determine if a collision course were imminent. Again, "whisper and shout" operation could be employed to minimize mutual L-band EM interference with other numerous recreational craft and large vessels.

As with the airborne collision avoidance UNICORN™ system, various upgrade options could be offered recreational boaters in accord with the amount they already had invested in their craft. For those recreational craft operators that have invested in a GPS receiver, the U.S. Coast Guard hope that they also will invest in an AIS transponder possibly might may be fulfilled. However, the generic UNICORN™ system could prove to be a better investment for the owners of relatively inexpensive recreational boats. Moreover, its compatability with AIS might encourage such an owner to upgrade by adding a GPS receiver and the appropriate UNICORN™ system AIS upgrade module at a later date.

Another Department of Transportation (DOT) application of UNICORN™ could involve something akin to the forward terrain collision warning capability adapted to receive two or three adjacent beams to interrogate directly ahead and, when traveling on a curved part of a railroad track, left an right. This would act to obviate rear end collisions of a follower train plowing into a leader train. Conversely, a similar UNICORN™ adaptation mounted on the rear of a train could instruct the train engineer to speed up so as to avoid the opposite situation. Again, an AIS capability could be integrated into such a UNICORN™ system adaptation.

The invention may be embodied in other specific forms without departing from the spirit or essential characteristics thereof The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein. In the claims, for example, the use of the term "generally spherical" is intended to cover both the spherical antenna 14 and the hemispherical or other solid-angle sector adaptations described above.

What is claimed is:

1. A collision avoidance system for use in a vehicle comprising a dielectric antenna shaped at least as part of a sphere formed by a plurality of sectors, an L-band microwave transmitter, a plurality of transmit/receive switches with one of said switches associated with a respective one of said sectors, means connecting said transmitter to said switches so that when said switches are in a transmit mode a plurality of L-band microwave signals are transmitted simultaneously from said sectors omnidirectionally around said antenna, a plurality of L-band microwave detectors with one of said detectors associated with a respective one of said sectors to detect, when said switches are in a receive mode, a return microwave signal reflected from an obstacle in the area surrounding the vehicle, circuit means for processing return microwave signals to provide an output signal containing information regarding said obstacle, and display means connected to said circuit means for displaying that information to the operator of the vehicle enabling the operator to take appropriate action to avoid a collision with the obstacle.

2. The collision avoidance system of claim 1, wherein the vehicle is an aircraft and the antenna is a dielectric sphere mounted on top of the aircraft.

3. The collision avoidance system of claim 1, wherein the vehicle is an aircraft and the antenna is formed in upper and lower hemispheres each including a plurality of sectors, the upper hemisphere being mounted on top of the aircraft and the lower hemisphere being mounted on the bottom of the aircraft.

4. The collision avoidance system of claim 1, wherein the vehicle is an aircraft and said sectors are distributed around the cross section of the aircraft to minimize aerodynamic drag.

5. The collision avoidance system of claim 1, wherein the vehicle is a marine vessel and the antenna is a dielectric hemisphere mounted on top of the vessel.

6. The collision avoidance system of claim 1, wherein said L-band microwave signals are transmitted at an intensity to provide a sphere of safety having a radius of about two to five nautical miles around said vehicle.

7. The collision avoidance system of claim 1, said display means being a transparent sphere formed by a plurality of display sectors equal in number to the sectors in said antenna, each of said display sectors being positioned and oriented substantially identically to a corresponding respective antenna sector so that the operator of the vehicle observing the display sectors is automatically informed of the directional location of the obstacle.

8. A collision avoidance system for use on an aircraft comprising a hollow dielectric antenna shaped at least as part of a sphere formed by a plurality of equal sized wedge sectors, each sector having an outer spherical surface and three flat surfaces extending radially inward toward the center of the sphere, an L-band microwave transmitter, a plurality of transmit/receive switches mounted within said antenna with each of said switches associated with a respective one of said sectors, means connecting said transmitter to said switches so that when said switches are in a transmit mode a plurality of L-band microwave signals are transmitted simultaneously from said sectors omnidirectionally around said antenna, a plurality of L-band microwave detectors mounted within said antenna with each of said detectors associated with a respective one of said sectors to detect, when said switches are in a receive mode, a return microwave signal reflected from an obstacle in the area surrounding the aircraft and received by its respective sector, the flat sides of said sectors being coated with a conductive material to guide a return signal through a sector to its associated detector, circuit means for processing return microwave signals to provide an output signal containing information regarding said obstacle, and display means connected to said circuit means for displaying that information to the operator of the vehicle enabling the operator to take appropriate action to avoid a collision with the obstacle.

9. The collision avoidance system of claim 8, wherein the antenna is a dielectric sphere mounted on the aircraft.

10. The collision avoidance system of claim 8, wherein the antenna is formed in upper and lower hemispheres each including a plurality of sectors, the upper hemisphere being mounted on top of the aircraft and the lower hemisphere being mounted on the bottom of the aircraft.

11. The collision avoidance system of claim 8, wherein the vehicle is an aircraft and said sectors are distributed around the cross section of the aircraft to minimize aerodynamic drag.

12. The collision avoidance system of claim 8, wherein said L-band microwave signals are transmitted at an intensity to provide a sphere-of-safety having a radius of about two to five nautical miles around said aircraft.

13. The collision avoidance system of claim 8, said display means being a transparent sphere formed by a plurality of display sectors equal in number to the sectors in said antenna, each of said display sectors being positioned and oriented identically to a corresponding respective antenna sector so that the pilot of the aircraft observing the display sectors is automatically informed of the directional location of the obstacle.

14. The collision avoidance system of claim 8, wherein the obstacle is a threat aircraft, forward terrain, or ground.

* * * * *